United States Patent [19]

Ode

[11] Patent Number: 5,031,388
[45] Date of Patent: Jul. 16, 1991

[54] DOG HAT APPARATUS AND METHOD

[76] Inventor: April Ode, 1510 Catherine Dr., Lake Havasu City, Ariz. 86403

[21] Appl. No.: 469,718

[22] Filed: Jan. 24, 1990

Related U.S. Application Data

[63] Continuation of Ser. No. 211,048, Jun. 24, 1988, abandoned.

[51] Int. Cl.⁵ .................. B68C 5/00; A01K 13/00
[52] U.S. Cl. .................................................. 54/80
[58] Field of Search ............... 54/79, 80, 81; 119/142; 2/10, 177, 195, 423

[56] References Cited

U.S. PATENT DOCUMENTS

| | | | |
|---|---|---|---|
| 100,000 | 2/1870 | Anderson | 54/80 |
| 120,208 | 10/1871 | McGovern | 54/80 |
| 342,186 | 5/1886 | Corley | 54/80 |
| 382,668 | 5/1888 | Sullivan et al. | 54/80 |
| 669,909 | 3/1901 | Young | 54/80 |
| 673,738 | 5/1901 | Spong | 54/80 |
| 750,505 | 1/1904 | Walther | 54/80 |

FOREIGN PATENT DOCUMENTS 18288 of 1900 United Kingdom ............... 54/80

Primary Examiner—Robert P. Swiatek
Attorney, Agent, or Firm—Harry M. Weiss

[57] ABSTRACT

A hat apparatus to protect a four-legged animal from extreme heat and direct sunlight. The hat comprises a head covering section, a visor section to protect the animal's eyes from sunlight, apertures to permit the passage of the animal's ears therethrough, and a chin strap to attach to the chin or bottom portion of the head of the animal. Preferably, the animal hat is used for dogs and the head covering comprises a liquid absorbable material for absorbing, for example, cold water in order to provide a cool hat apparatus for the animal.

3 Claims, 1 Drawing Sheet

DOG HAT APPARATUS AND METHOD

This is a continuation of co-pending application Ser. No. 211,048 filed on June 24, 1988.

BACKGROUND OF THE INVENTION

1. Field of the Invention

The present invention generally relates to a head covering and eye protection apparatus and method for four legged animals and, more specifically, to a hat apparatus and method for any four-legged animal which keeps the animal such as a dog cool in hot weather and protects their skin and eyes from conditions of extreme heat and direct sunlight.

2. Description of the Prior Art

During periods of hot weather and/or bright sunlight, many dogs and other four-legged animals are in extreme heat and direct sunlight conditions for most of the day since they are usually in the outdoors. As a result, these animals often overheat. Also, sunlight is harmful for animals' eyes, as they have no means to protect themselves from harmful ultraviolet rays. Prior to this invention, dog and animal owners could only keep their pets indoors for long periods of time to try to protect them from these dangers. This invention will allow a four legged animal such as a dog to remain outdoors, under conditions of extreme heat and direct sunlight, without suffering from any of the previously mentioned problems.

SUMMARY OF THE INVENTION

It is an object of this invention to provide a head covering and eye protection apparatus and method for keeping animals at a comfortable and healthy temperature, even in extreme heat.

It is a further object of this invention to provide a head covering and eye protection apparatus and method for protecting animal's eyes from direct sunlight.

It is a still further object of this invention to provide a head covering and eye protection apparatus and method for protecting dogs with skin problems from the harmful effects of the sun.

It is still another object of this invention to provide a head covering and eye protection apparatus and method for protecting horses and other four-legged animals from the same dangers, using the same invention as adapted for that animal.

It is another object to provide a head covering and eye protection apparatus and method for protecting dogs and other four-legged animals of all sizes and breeds from these dangers.

The aforementioned and other objects are accomplished, according to the present invention, by an adjustable, varying sized hat comprised of an absorbent insulation material which contains cold fluids, and a connected visor extending over the animal's eyes.

The foregoing and other objects, features and advantages of this invention will be apparent from the following, more particular, description of the preferred embodiments of this invention, as illustrated in the accompanying drawings.

DESCRIPTION OF THE PREFERRED EMBODIMENT

Figure 1:
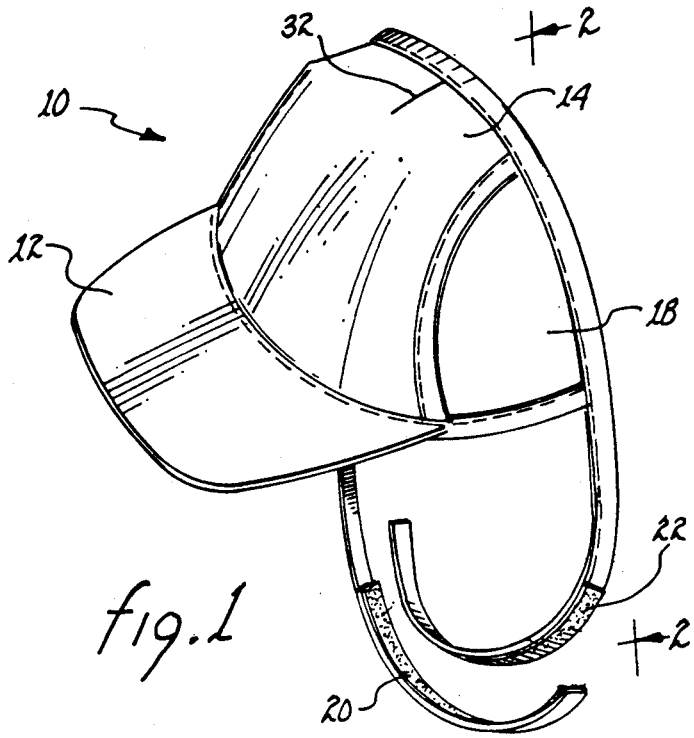
FIG. 1 is a perspective view of the hat apparatus of this invention.

Referring now to FIG. 1 of the accompanying drawings which set forth the present invention in greater detail and in which like numerals designate like features, an animal (i.e. dog) hat apparatus 10 is generally comprised of a visor section 12, a head covering section 14, a right ear hole 16 (see FIG. 2), a left ear hole 18, a right lower chin strap 20, and a left lower chin strap 22. The visor section 12 extends over the animal's face to protect the animal's eyes from direct sunlight exposure.

Figure 2:
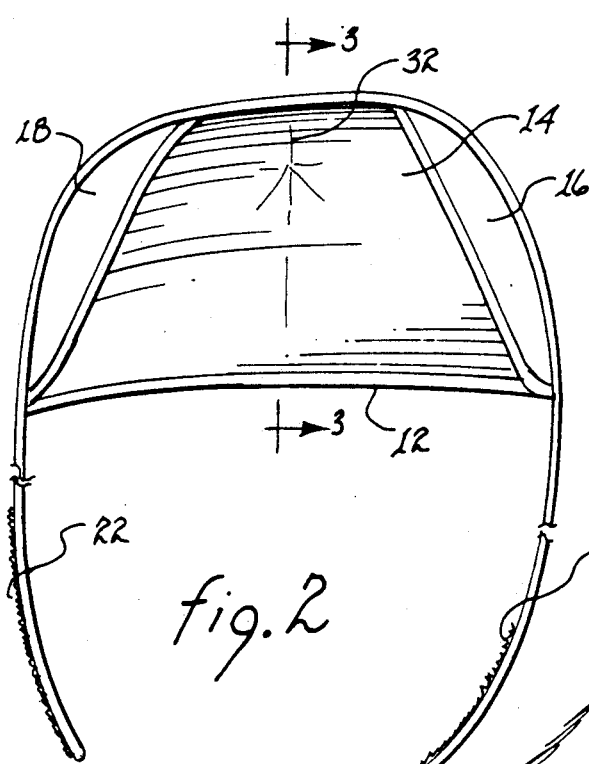
FIG. 2 is a rear view of the hat apparatus of FIG. 1 taken along the line 2—2 of FIG. 1.

Referring to FIG. 2, the head covering section 14 is constructed with a folded or creased peak feature 32. This folded or creased peak feature 32 allows the animal hat 10 to properly fit an animal's head because of the increased flexibility provided by the crease portion that permits snug folding of the hat apparatus 10 onto the animal's (i.e. dog's) head.

Figure 3:
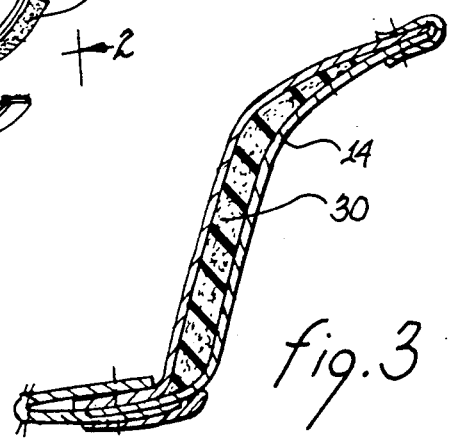
FIG. 3 is a cross-sectional side view, taken along line 3—3 of FIG. 2.

As best shown in FIG. 3, the head covering section 14 of the dog hat 10 is constructed out of a preferably liquid absorbent insulation material 30. When the animal hat 10 is used, a cold liquid such as cold water, if desired, can be applied to the head covering section 14. The absorbent insulation material 30 absorbs the cold liquid, keeps it cold and prevents it from rapidly evaporating in the heat. The animal's head is then constantly in contact with the cold absorbent insulation material 30 which cools the dog's head thereby preventing the animal from overheating. The contact of the cold absorbent insulation material 30 on the animal's head also prevents certain skin problems from which some short-haired dogs suffer.

Figure 4:
FIG. 4 is a view of the hat as, for example, worn by a pointed-eared or any ear up breed of dog.
Figure 5:
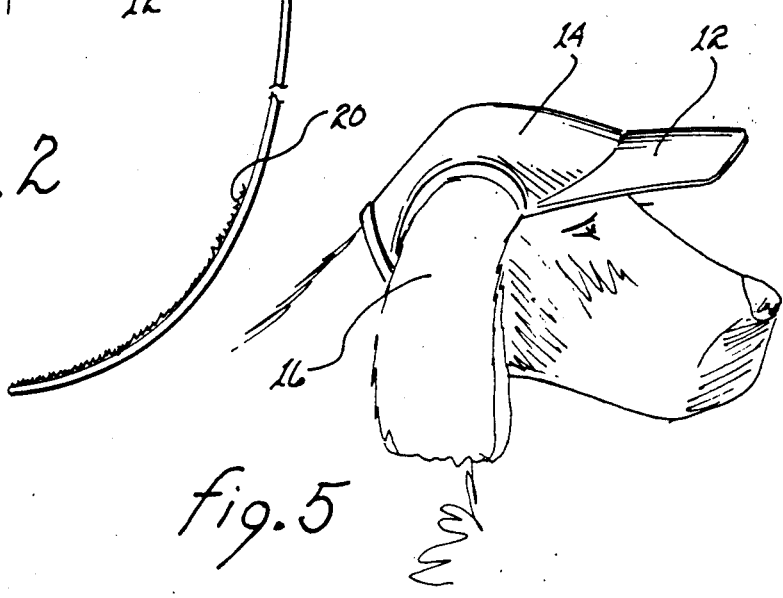
FIG. 5 is a view of the hat as, for example, worn by a floppy-eared or any ear down breed of dog.

As best shown in FIGS. 4 and 5, the hat 10 is put on top of the animal's (dog's) head, with each ear inserted through the appropriate ear hole 16 or 18. The head covering section 14 fits against the top of the animal's head. The folded or creased peak feature 32 allows the head covering section 14 to correctly fit over the animal's head. The chin straps 20 and 22 are brought down around the animal's chin and fastened to secure the hat 10 in place. In one preferred embodiment, Velcro fasteners are attached to the right and left chin straps 20 and 22. The Velcro fasteners provide for ease in securing and removing the animal hat 10. Another embodiment using the chin straps 20 and 22 comprises the use of an adjustable clasp or a fastener (not shown) which provides an alternative means of securing the hat on the animal's head.

As best shown in FIG. 4, the animal hat 10 can accommodate an animal with pointed ears, or as best shown in FIG. 5, the animal hat 10 can also accommodate an animal with floppy ears. The hat 10 can be constructed in a plurality of sizes to fit any size or breed of animal. A variation of this invention is a similar hat 10 for a horse (not shown). The horse hat would fit onto a horse's head, similar to the dog hat. Another embodiment not shown allows the hat to be attached to the horse's bridle for extra security. The material covering the visor section 12 and the head covering section 14 can be a fabric of any print, pattern, color, or texture, as desired.

While the invention has been particularly shown and described in reference to the preferred embodiments thereof, it will be understood by those skilled in the art that changes in form and details may be made without departing from the spirit and scope of the invention.

I claim:

1. A hat apparatus to protect a dog's head, muzzle and eyes from the sun comprising, in combination:
   a covering having the configuration of a baseball type hat comprising:
   a head covering section having liquid absorbable means in contact with said dog's head for absorbing liquid and for providing a wet contact surface directly on the head of said dog for cooling the dog's head;
   aperture means located on opposite sides of said head covering section for permitting a dog's ears to be inserted therethrough;
   chin strap means attached to said head covering section having two strips and quick attach-detach fastener means connected to each of said two straps for securing said hat apparatus to the head of said dog; and
   eye and muzzle protection means comprising a visor section attached to the front end of said head covering section and extending outwardly a sufficient distance from said head covering section for shading the dog's eyes and the upper half of the dog's muzzle from both direct and reflected sunlight.

2. A dog hat apparatus in accordance with claim 1 wherein said quick-attach-detach means comprising two Velcro strips, one of said Velcro strips connected to one of said two straps and the other of said Velcro strips connected to the other of said two straps.

3. A method for protecting a dog's head, muzzle and eyes form the sun comprising the steps of:
   providing a covering having the configuration of a baseball type hat;
   providing a head covering section comprising a liquid absorbable material in contact with said dog's head;
   applying cold liquid to said head covering section to permit said head covering section to directly cool the dog's head by direct contact of said liquid absorbable material with said dog's head;
   providing a visor section attached to said head covering section and extending outwardly a sufficient distance from said head covering section for shading the dog's eyes and the upper half of the dog's muzzle form both direct and reflected sunlight;
   providing two apertures through which a dog's ears can extend;
   providing a chin strap attached to said head covering section having two straps and quick attach-detach means comprised of two Velcro strips one of which is connected to each of said two straps; and thereafter;
   inserting the dog's ears through said apertures;
   locating said head covering section on top of the dog's head; and
   securing said chin strap under the dog's chin by attaching said two Velcro strips.

* * * * *